(12) United States Patent
Steuernagel et al.

(10) Patent No.: US 8,131,454 B2
(45) Date of Patent: Mar. 6, 2012

(54) METHOD FOR STARTING AN INTERNAL COMBUSTION ENGINE

(75) Inventors: Frank Steuernagel, Stuttgart (DE);
Jens-Werner Falkenstein, Aalen (DE);
Markus Vogelgesang, Ingersheim (DE);
Martin Lang, Hausleitel (AT); Karsten Kroepke, Ludwigsburg (DE); Christian Muehlbauer, Eitensheim (DE)

(73) Assignee: Robert Bosch GmbH, Stuttgart (DE)

( * ) Notice: Subject to any disclaimer, the term of this patent is extended or adjusted under 35 U.S.C. 154(b) by 876 days.

(21) Appl. No.: 12/182,888

(22) Filed: Jul. 30, 2008

(65) Prior Publication Data
US 2009/0063029 A1 Mar. 5, 2009

(30) Foreign Application Priority Data
Aug. 29, 2007 (DE) .......................... 10 2007 040 727

(51) Int. Cl.
*F02D 45/00* (2006.01)
(52) U.S. Cl. ................... 701/113; 123/179.28; 180/65.2
(58) Field of Classification Search .......... 701/102–104, 701/110–111, 114–115; 123/179.16, 179.17, 123/179.1, 179.3; 290/25, 27, 34, 51; 903/902
See application file for complete search history.

(56) References Cited

U.S. PATENT DOCUMENTS

| | | | |
|---|---|---|---|
| 6,232,733 B1 * | 5/2001 | Obayashi et al. | 318/432 |
| 6,543,561 B1 * | 4/2003 | Pels et al. | 180/65.23 |
| 6,877,487 B2 * | 4/2005 | Vogt et al. | 123/490 |
| 2004/0144363 A1 | 7/2004 | Ament | |

FOREIGN PATENT DOCUMENTS

| | | |
|---|---|---|
| DE | 198 14 402 | 10/1999 |
| GB | 2 416 861 | 2/2006 |

* cited by examiner

*Primary Examiner* — John T. Kwon
*Assistant Examiner* — Johnny Hoang
(74) *Attorney, Agent, or Firm* — Kenyon & Kenyon LLP

(57) ABSTRACT

A method is described for starting an internal combustion engine having an E-machine coupled to it in a motor vehicle, after the input of a certain torque command at a drive control of the internal combustion engine, the internal combustion engine being accelerated for the start by the E-machine, and the internal combustion engine being set by the drive control, via actuators, to specified characteristics values for the start. To reduce exhaust gas emissions at the start of the internal combustion engine, the internal combustion engine is accelerated by the E-machine, without the injection of fuel, until the engine torque that is able to be implemented by the internal combustion engine, essentially corresponds to the torque command, and the injection of fuel into the internal combustion engine is only then released.

9 Claims, 3 Drawing Sheets

METHOD FOR STARTING AN INTERNAL COMBUSTION ENGINE

FIELD OF THE INVENTION

The present invention relates to a method for starting an internal combustion engine that has an E-machine (electric machine) coupled to it in a motor vehicle, after the input of a certain torque command at a drive control of the internal combustion engine, the internal combustion engine being accelerated for the start by the E-machine, and the internal combustion engine being set by the drive control, via actuators, to specified characteristics values for starting. The present invention further relates to a computer program product, to a drive control for starting an internal combustion engine of a vehicle and to a motor vehicle having an internal combustion engine, an E-machine coupled to it and a drive control.

BACKGROUND INFORMATION

One may carry out the start of an internal combustion engine in vehicles as rapidly as possible, in order to stress the engine starter and the vehicle's battery as little as possible. All engine-specific actuators, such as the throttle valve, fuel injectors, ignition time are controlled via fixed characteristics values, in this context. The engine speed at the start of an internal combustion engine is not optimal with respect to exhaust gas emissions.

German patent document DE 10 2004 039 838 A1 discusses a method for a started internal combustion engine, according to which an absolute boost pressure in an internal combustion engine of a hybrid-electric vehicle is controlled in an emission-reducing manner using a parallel electric motor/generator, by distributing the torque to the internal combustion engine and the electric motor as a function of environmental parameters.

SUMMARY OF THE INVENTION

It is an object of the exemplary embodiments and/or exemplary methods of the present invention to refine a computer program product, a drive control and a motor vehicle of the type named at the outset in such a way that the exhaust gas emissions in response to starting the internal combustion engine of the vehicle are reduced.

According to the exemplary embodiments and/or exemplary methods of the present invention, this object is attained by the subject matter described herein. Further refinements of the exemplary embodiments and/or exemplary methods of the present invention are further described herein.

One aspect of the exemplary embodiments and/or exemplary methods of the present invention is that the motor vehicle is developed to have an efficient E-machine (electric motor), that is able to deliver a high torque output, and that the motor vehicle is developed to have an efficient energy store, so that the internal combustion engine is basically able to be operated for a longer period at a higher speed than compared to vehicles according to the related art. Consequently, the internal combustion engine may be brought into a longer, externally driven state at starting, so that immediately upon starting, which is determined by an injection of fuel, the internal combustion engine generates optimally low exhaust gas emissions at advantageously low consumption. In this context, the torque is able to be favorably adapted to the requirement state for the start, to a variably specifiable torque command which, as a rule, is lower than for a start of the internal combustion engine according to the related art. So-called rotational speed overshooting may thus be avoided or clearly reduced.

The object may be attained by the method in such a way that the internal combustion engine is accelerated by the E-machine, without the injection of fuel, until an engine torque, that is able to be implemented by the internal combustion engine, corresponds essentially to the torque command, and then the injection of fuel is first released.

Thus, only when a certain torque command is attainable by the internal combustion engine, using specified characteristics values, is the fuel injection released. At that point, a specified engine torque ia able to be implemented by the internal combustion engine. Consequently, the internal combustion engine is no longer started as rapidly as possible, but only when the air intake pressure in the intake pipe is so low that a preset torque command can be implemented. Therefore, according to the exemplary embodiments and/or exemplary methods of the present invention, the starting point is delayed, which may be slightly, to a time that is optimal for exhaust gas emission.

The throttle valve may be set by at least one actuator to a certain air/fuel ratio for the start. The setting may also be varied by control of the actuator so that it reaches the desired torque command before the start, for instance, as a function of the rotational speed.

The characteristics values for the internal combustion engine with respect to the engine torque may advantageously be called up from a look-up table. The characteristics values are set down from the look-up table. The torque command is calculated from the acceleration and from the intensity of operation of the accelerator. The characteristics values of the internal combustion engine required for this may also be calculated, alternatively or in addition to a look-up table.

The E-machine is advantageously used as a sensor, to check whether the engine torque that is to be raised, calculated or looked up is able to be implemented by the internal combustion engine.

In order to start the internal combustion engine at low exhaust gas emissions and without rotational speed overshooting, the air intake pressure is measured. Thereby, air intake pressure values are generated as defined characteristics values, using which the torque command may be implemented. Thus, according to the exemplary embodiments and/or exemplary methods of the present invention, the internal combustion engine is started only when it is exactly able to provide the torque command that has especially been calculated. The internal combustion engine is not started yet if it provides too great a torque or, outside of a tolerance range, too low a torque. The internal combustion engine may be started with a combustion of a lean air/fuel mixture.

In order to shorten the time for starting the internal combustion engine after the input of the torque command at the internal combustion engine, the point of ignition is reset, in particular, the point of ignition is retarded. This achieves that, at a certain setting of the throttle valve, a low torque at a lower rotational speed is reached more rapidly. A low torque is desirable at least at the start, in order to ensure a soft transition from the E-machine to the internal combustion engine, and to avoid rotational speed overshooting. Besides, the intention with hybrid vehicles is that the torque transition from the drive of the E-machine to the internal combustion engine should take place as uniformly as possible, and be imperceptible to the passengers.

According to one specific embodiment that refines the present invention, the temperature of the internal combustion engine, especially as measured via the coolant temperature, the temperature of the internal combustion engine may especially be set before the start. The temperature of the internal combustion engine also influences the torque of the internal combustion engine, so that this variable is taken into account when calling up characteristics values from the look-up table. According to one further exemplary embodiment, the temperature of the internal combustion engine is set for cooling circulation and heat circulation in such a way that the internal combustion engine is started at minimized exhaust gas emissions, that is, reduced consumption.

According to one further exemplary embodiment, gas exchange valves, the intake valves and/or exhaust valves at each cylinder of the internal combustion engine, are able to be adjusted for achieving the set engine torque for the earlier reaching of an agreement of torque command and engine torque. The setting of the opening and closing times of the gas exchange valves also has an effect on the torque of the internal combustion engine, so that the internal combustion engine reaches the torque command more rapidly. After the starting of the internal combustion engine, a so-called rich combustion briefly takes place, in order to start the catalytic converter to catalytic combustion.

According to a first specific embodiment, the internal combustion engine is started in the condition "standing" of the vehicle. Consequently, in a vehicle having an E-machine which works exclusively as starter and generator, the method according to the present invention is able to be implemented in a simple manner. The E-machine is not used as drive support, in this case. The internal combustion engine that is being started by the method according to the present invention, because of the brief, extended, externally driven accelerating and starting, using fully known characteristics values for implementing a desired, specified, low engine torque, advantageously has low exhaust gas emissions without having rotational speed overshooting.

The method may be used particularly advantageously in an electric hybrid vehicle, if the internal combustion engine is started during travel at a speed. This has the advantage that the hybrid vehicle uses an E-machine for the driveaway, especially in ranges in which an internal combustion engine does not work in a particularly consumption-reducing manner. The internal combustion engine is started during travel only when it is able to implement a desired torque command.

According to one specific embodiment refining the present invention, a torque is output to the drive wheels by an E-machine and/or the internal combustion engine as a function of acceleration and the requested torque, a torque coordinator of the drive control regulating the use of the E-machine and/or the internal combustion engine. The torque coordinator according to the present invention collaborates with a start coordinator, which releases the injection of fuel in the internal combustion engine only when a set engine torque is able to be implemented by the internal combustion engine. Consequently, the internal combustion engine is not started immediately upon detection of an increased torque command, but, retarded in time, only when the implementable torque is in a certain tolerance range, and, in particular, is equal to or less than the torque command.

The object is also attained by a computer program product which is able to be loaded into a memory of the drive control, having program commands for executing all the steps of the method described above, when the program is executed in the drive control.

Thus the object is also attained by a drive control for starting an internal combustion engine of a vehicle, which carries out the method described above, using a computer program.

Furthermore, the object is also attained by a motor vehicle, an internal combustion engine and an E-machine coupled to it, as well as a drive control, in that the E-machine has a greater torque output and an electric energy store is developed to be dimensioned in such a way that the method described above is able to be carried out. Thus a usual vehicle requires a larger energy store, according to the exemplary embodiments and/or exemplary methods of the present invention, in the case in which the internal combustion engine is accelerated without fuel injection until the internal combustion engine has the required characteristics values, especially a provided air intake pressure, in order to be started.

It is understood that the aforementioned features, which will be discussed below, are able to be used not only in the individually indicated combination but also in other combinations.

The present invention is elucidated below on the basis of an exemplary embodiment, with reference to the drawings.

DETAILED DESCRIPTION

Figure 1:
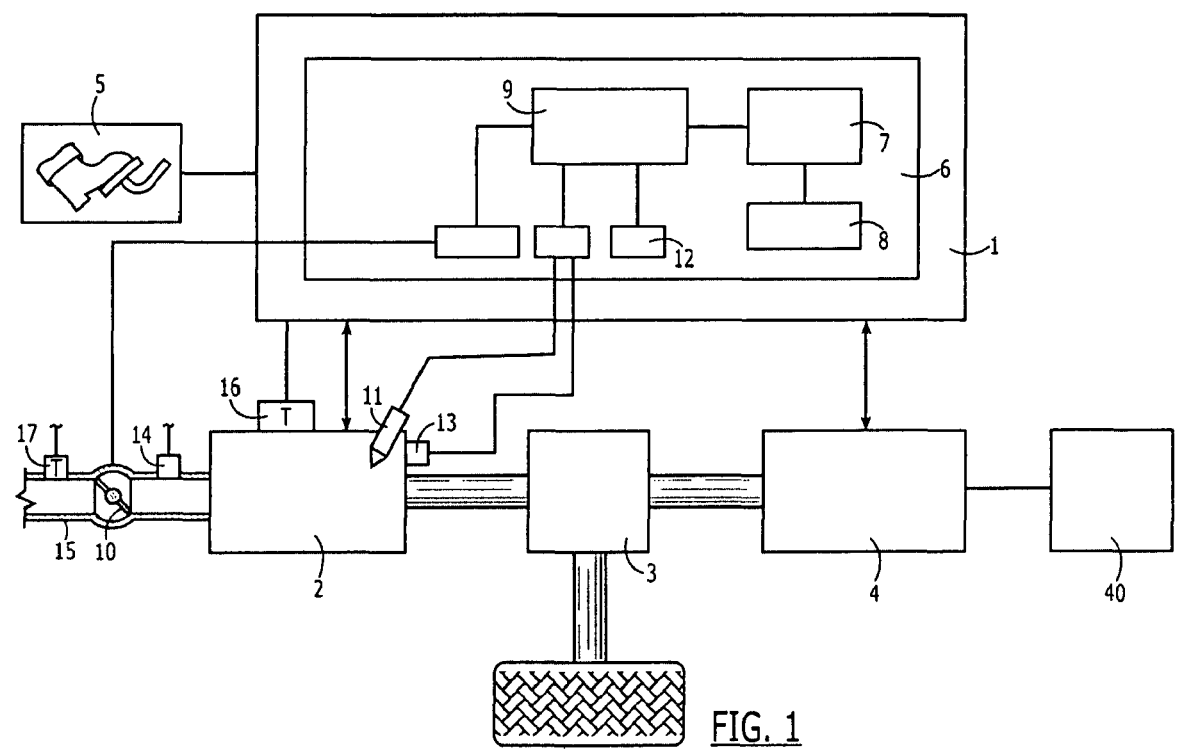
FIG. 1 shows a schematic view of a circuit diagram of a control device according to the present invention.

FIG. 1 shows a schematic circuit diagram of a drive control 1 according to the exemplary embodiments and/or exemplary methods of the present invention, for starting an internal combustion engine 2, that is coupled to a power train 3 and to an E-machine (electric motor) 4. The circuit diagram shows the construction of a hybrid vehicle. E-machine 4 has a plurality of functions that are implemented by one or more electric motors, and also possibly assume only one function alone. Basically, E-machine 4 is used as starter for internal combustion engine 2, as generator for generating current for a vehicle having an electric energy store 40 and as drive motor for driving the vehicle via power train 3 by itself or for the support of the drive together with internal combustion engine 2.

A hybrid coordinator 6 is a part of drive control 1, and controls E-machine 4 and internal combustion engine 2, based on signals from transducer 5. Transducer 5 includes devices operated by the driver in order to set a certain driving state. The devices are an accelerator, a brake pedal and a transmission transducer, as well as an engine start signal transducer that is a separate start button or is integrated into an ignition lock.

Drive control 1 includes several control modules. To start the internal combustion engine, a start coordinator 7 is provided. Start coordinator 7 is in operative connection to a torque coordinator 8. Depending on demand, torque coordinator 8 decides which drive motor, internal combustion engine 2 or E-machine 4, or both together, provide which output torque, in order to implement the requested torque. Start coordinator 7 is coupled to a start-stop module 9 for starting and stopping internal combustion engine 2. Using the start-stop module, an actuator 10 is activated for setting the throttle valve, an actuator 11 is activated for fuel injection, that is, injection valve and injection pump, an ignition control 12 is activated and a device 13 for opening and closing gas exchange valves.

Internal combustion engine 2 includes at least one pressure sensor 14 for measuring the boost pressure in intake pipe 15, so as to evaluate from it, using drive control 1, whether the requested torque command is able to be implemented by internal combustion engine 2 as the engine torque. Start coordinator 7 has a modular device, according to the exemplary embodiments and/or exemplary methods of the present invention, which emits a start signal to the start/stop module, for starting the internal combustion engine, when the torque command essentially corresponds to the engine torque that is able to be implemented.

In order to refine drive control 1, especially start coordinator 7, temperature T of internal combustion engine 2 and the aspirated fresh air may be taken into account, using temperature sensors 16, 17.

Figure 2:
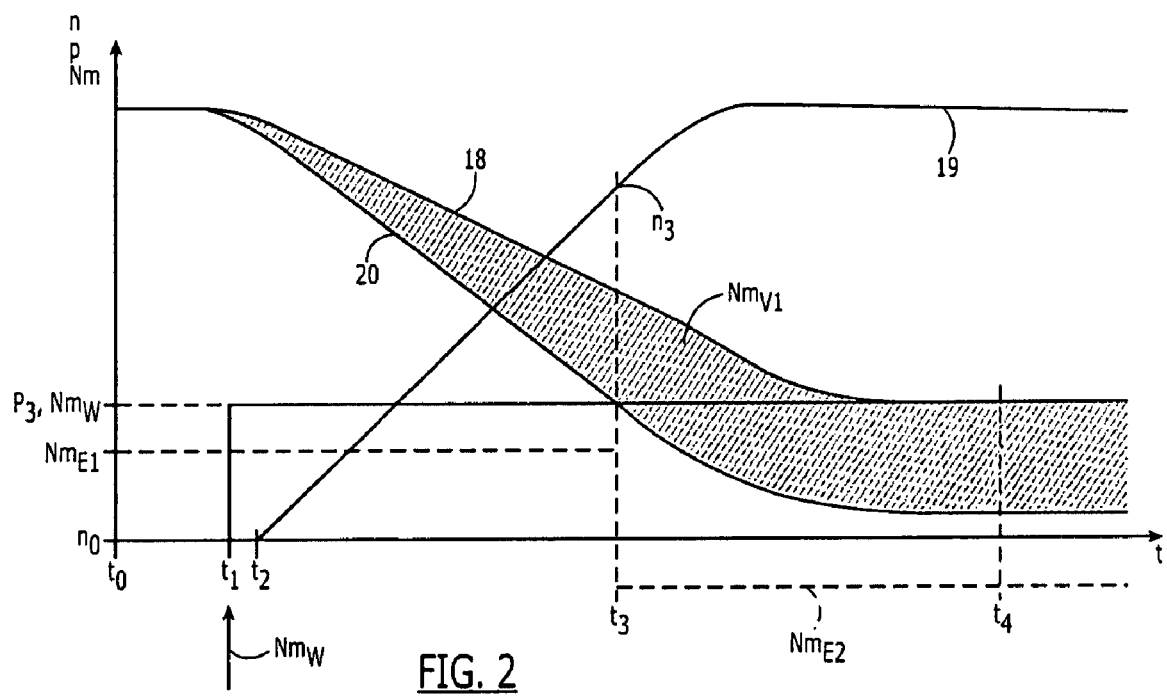
FIG. 2 shows a diagram of a sequence in time in a hybrid vehicle that is controlled by a control device according to the present invention.

FIG. 2 shows a diagram having a time sequence of the start of an internal combustion engine 2 in a hybrid vehicle. Time t is shown on the abscissa, and on the ordinate, rotational speed n, air pressure p in intake pipe 15 of internal combustion engine 2 and torque Nm are plotted. FIG. 2 shows the time sequence in a vehicle having a parallel hybrid drive. The Hybrid drive has the circuit layout shown in FIG. 1, for example. At time $t_0$ internal combustion engine 2 is shut down, and the vehicle is driven exclusively by E-machine 4 or is standing still. E-machine 4 outputs a torque $Nm_{E1}$, in this context. At time $t_1$ the driver requests a greater torque from the vehicle, for instance, a torque command $Nm_W$. To do this, via the accelerator, the driver passes on to signal transducer 5 the command for a higher torque to drive control 1.

At time $t_1$, to set the throttle valve, a target torque is set using torque characteristics line 18, so that an air path is drawn which represents the intake pressure in intake pipe 15 in a temporal view inversely proportional to the acceleration of an externally driven speed n of internal combustion engine 2. According to the exemplary embodiments and/or exemplary methods of the present invention, internal combustion engine 2 is not started immediately. Internal combustion engine 2 is accelerated by E-machine 4 from a standstill having speed no to a speed n that corresponds to speed characteristics line 19.

During the acceleration of internal combustion engine 2 without injection, using actuator 11, the air pressure in internal combustion engine 2, which initially is equal to the environmental pressure of ca. 1 bar, is reduced corresponding to torque characteristics line 18, until the engine torque that is implementable by internal combustion engine 2 is essentially equivalent to the torque command requested by the driver. Torque command $Nm_W$ is lower than at the start of the internal combustion engine having a high intake boost pressure. An engine torque $Nm_{V1}$ in the range of torque command $Nm_W$ has a lesser consumption and thus lower emissions. Also, no rotational speed overshooting occurs, which could be perceived as being disturbing.

In order to advance torque characteristics line 18, that is a function of the intake pressure, in time, the ignition angle may be adjusted via ignition angle control 12, so that internal combustion engine 2 reaches earlier in time, for instance, already at time $t_2$, desired implementable engine torque $Nm_{V1}$ along with emissions optimized as to consumption. The ignition angle is set back to a retard setting and it produces a decrease in the engine torque. Temporally advanced torque characteristics line 20 represents a so-called ignition path.

At time $t_3$, torque command $Nm_W$ corresponds to engine torque $Nm_{V1}$ that is implementable by internal combustion engine 2 having a rotational speed $n_3$ and an intake pressure $p_3$, so that the ignition is now released by an injection of fuel using actuator 11 by transmitting a signal from start coordinator 7 to start/stop module 9, so that the internal combustion engine starts.

The output torque is subsequently coordinated by torque coordinator 8, so that power train 3 is only still driven by internal combustion engine 2. E-machine 4 is switched over at time $t_3$ from operation as drive motor to an operation as generator (recuperation operation). E-machine 4 takes up a torque beginning at time $t_3$ and is therefore shown in the diagram as having a negative torque $-Nm_{E2}$.

At time $t_4$, torque characteristics line 16 also reaches torque command $Nm_{V1}$. Internal combustion engine 2 is able to be ignited between times $t_3$ and $t_4$. The closer the ignition time of internal combustion engine 2 is to time $t_3$, the more electrical energy store 40, for instance, a heavy-duty battery or a high-powered capacitor is unloaded, at the same time internal combustion engine 2 being started and further operated at an advantageously low exhaust gas emission boundary value.

Besides that, at ignition time $t_3$, additional parameters, such as temperature T of the internal combustion engine and of the fresh air, as well as the piston positions in the cylinders for the operation of internal combustion engine 2 are known, so that internal combustion engine 2 is being started having emission values that are low in optimized fashion. The time sequence diagram is transferable in the same manner to a usual vehicle having an efficient starter as E-machine 4 and an efficient electric energy store 40.

Figure 3:
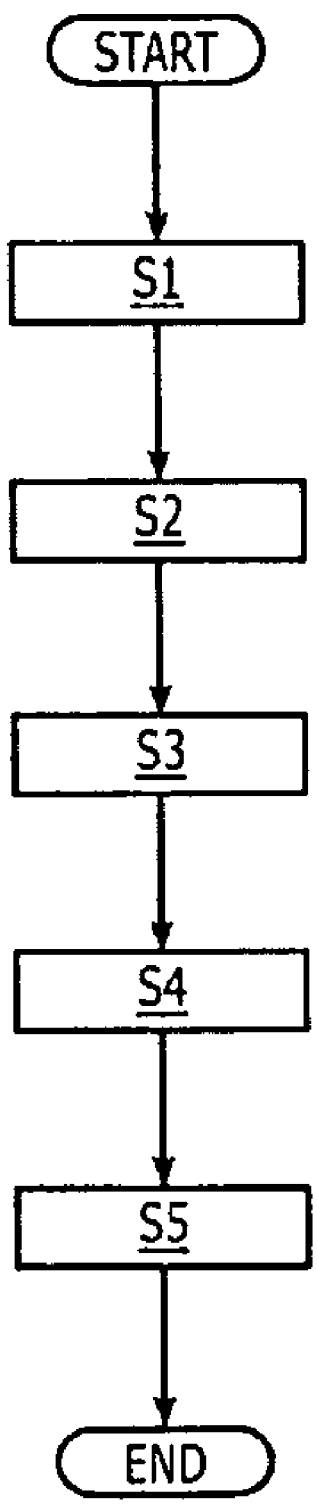
FIG. 3 shows a flow chart of the method according to the present invention.

FIG. 3 shows a flow chart for a method according to the present invention, for starting an internal combustion engine 2, which is implemented in, and integrated into a drive control 1 according to the exemplary embodiments and/or exemplary methods of the present invention, using a computer program product, which may be in a fully hybrid vehicle. Fully hybrid vehicle means that the vehicle, for its drive, uses at least one E-machine by itself and as drive support for the internal combustion engine. However, the control method may also be used for vehicles having a so-called microhybrid drive or mild hybrid drive. Microhybrid means that the internal combustion engine has a start/stop module in the drive control, which automatically starts and stops the internal combustion engine. In addition, the E-machine is used as a generator for braking. Mild hybrid means that the E-machine is put into use for drive support by the torque coordinator.

At time to, the sequence is begun at START. At time $t_1$, an inquiry comes from accelerator, signal transducer 5, for a higher torque command $Nm_W$, which E-machine 4 working at time $t_0$ is no longer able to supply, so that internal combustion engine 2 has to be started. The decision as to whether E-machine 4 is to be used by itself, internal combustion engine 2 by itself or both together as the drive is made by torque coordinator 8 as a submodule of drive control 1 and hybrid coordinator 6. Then, torque coordinator 8 gives a signal to start coordinator 7, which calculates the torque command $Nm_{V1}$ required for the acceleration signal, in step S1.

At time $t_2$, internal combustion engine 2 is coupled in step S2 to E-machine 4 via a clutch, and is accelerated from rotational speed no to n proportional to time t.

In step S3, in this context, engine characteristics values of internal combustion engine 2, such as the setting of the throttle valve to a certain air/fuel mixture ratio and a retarded ignition at ignition angle are set by drive control 1, using actuators 10, 12. Air intake pressure p that is inversely proportional to rotational speed n is monitored using a sensor 14. Air intake pressure p, according to the exemplary embodiments and/or exemplary methods of the present invention, determines the starting time of internal combustion engine 2, since air intake pressure runs proportional to implementable engine torque $Nm_{V1}$.

In step S4, drive control 1 determines that a torque command $Nm_W$ corresponds to engine torque $Nm_{V1}$ that internal combustion engine 2 is able to implement, or is lower but not higher, so that start coordinator 7 releases actuator 10 for the injection of fuel into internal combustion engine 2 and fuel is injected, and internal combustion engine 2 is started. In drive control 1, a sequence control of hybrid coordinator 6 goes back from start coordinator 7 to torque coordinator 8.

In step S5, torque command $Nm_{V1}$ is performed by internal combustion engine 2, torque coordinator 8 switches E-machine 4 over to generator operation, so that a negative torque $-Nm_{E2}$ of E-machine 4 is deducted from the engine torque of internal combustion engine 2. The sequence of the method is thus at the END.

The internal combustion engine may clearly be started earlier by an ignition angle retard setting. The exhaust gas emissions are reduced, since the internal combustion engine is started in a range having reduced fuel consumption. All the figures show only schematic illustrations that are not to scale. In all other respects, the drawings includes important representations of the exemplary embodiments and/or exemplary methods of the present invention.

What is claimed is:

1. A method for starting an internal combustion engine having an electric machine (E-machine) coupled to the internal combustion engine in a motor vehicle, the method comprising:
    inputting a certain torque command at a drive control of the internal combustion engine; and
    accelerating, after the input, the internal combustion engine for a start by the E-machine, the internal combustion engine being set by the drive control, via actuators, to defined characteristics values for the starting;
    wherein the internal combustion engine is accelerated by the E-machine without fuel injection into the internal combustion engine until the internal combustion engine reaches a predefined state in which an engine torque which is implementable by the internal combustion engine in the predefined state essentially corresponds to the torque command, and wherein the injection of fuel into the internal combustion engine is only started upon reaching the predefined state.

2. The method of claim 1, wherein a throttle valve is set, by at least one actuator to a certain air-fuel ratio for the start.

3. The method of claim 1, wherein an air intake pressure is measured to generate air intake pressure values as defined characteristics values of the internal combustion engine at which the engine torque which is implementable by the internal combustion engine corresponds to the torque command, the characteristics values being at least one of called up from a look-up table and calculated.

4. The method as of claim 1, wherein a point of ignition is adjusted so as to be retarded.

5. The method of claim 1, wherein a temperature of the internal combustion engine is measured via at least one of a coolant temperature and an air temperature, and wherein the temperature of the internal combustion engine is set before the start.

6. The method of claim 1, wherein gas exchange valves, which are at least one of intake valves and exhaust valves at each cylinder of the internal combustion engine, are adjusted for an earlier attainment of a set engine torque.

7. A non-transitory computer readable data storage medium storing a computer program having program codes which, when executed by a processor of a drive control, performs a method for starting an internal combustion engine having an electric machine (E-machine) coupled to the internal combustion engine in a motor vehicle, the method comprising:
    inputting a certain torque command in the drive control mode of the internal combustion engine; and
    accelerating, after the input, the internal combustion engine for a start by the E-machine, the internal combustion engine being set by the drive control, via actuators, to defined characteristics values for the starting;
    wherein the internal combustion engine is accelerated by the E-machine without fuel injection into the internal combustion engine until the internal combustion engine reaches a predefined state in which an engine torque which is implementable by the internal combustion engine in the predefined state essentially corresponds to the torque command, and wherein the injection of fuel into the internal combustion engine is only started upon reaching the predefined state.

8. A drive control of a motor vehicle, comprising:
    means for starting an internal combustion engine having an electric machine (E-machine) coupled to the internal combustion engine in the motor vehicle, by performing the following:
    inputting a certain torque command in the drive control mode of the internal combustion engine; and
    accelerating, after the input, the internal combustion engine for a start by the E-machine, the internal combustion engine being set by the drive control, via actuators, to defined characteristics values for the starting;
    wherein the internal combustion engine is accelerated by the E-machine without fuel injection into the internal combustion engine until the internal combustion engine reaches a predefined state in which an engine torque which is implementable by the internal combustion engine in the predefined state essentially corresponds to the torque command, and wherein the injection of fuel into the internal combustion engine is only started upon reaching the predefined state.

9. The drive control according to claim 8, wherein the E-machine has a high torque output and an efficient electrical energy store.

* * * * *